United States Patent Office 2,890,190
Patented June 9, 1959

2,890,190
POLYVINYL CHLORIDE RESIN-UREA-CLAY COMPOSITION AND METHOD OF MAKING SAME

Ross Van Volkenburgh, Borger, Tex., assignor to J. M. Huber Corporation, Borger, Tex., a corporation of New Jersey No Drawing. Application June 14, 1955
Serial No. 515,555

8 Claims. (Cl. 260—41)

This invention relates to a process and to new compositions for producing stable clay-filled polyvinyl chloride resins. The invention also relates to stabilized polyvinyl chloride resin compositions containing clay fillers.

Polyvinyl chloride resins which consist mainly of polymers or copolymers of vinyl chloride and/or vinylidene chloride, have a tendency to turn brown and become embrittled when heated, for example, at temperatures of 250° F. or higher. Temperatures of that order are commonly used in the fabrication of commercial products from these resins; so, it has long been the practice to inhibit or minimize the deterioration of the resin compositions by the addition of substances known in the art as stabilizers. Examples of such stabilizers are basic lead carbonate, mixtures of barium and cadmium laurates, and organic polyesters.

While such stabilizers are effective in polyvinyl chloride resin compositions that do not contain clays, it is well known that the addition of clays to serve as a filler or pigment material causes the development of a slate or gray color when the clay-filled resin is heated. This discoloration occurs even in the presence of the usual stabilizers. Some chemical additives are known, especially certain basic organic compounds, which will prevent the development of a slate color, but such substances cause a brown discoloration of the resin, instead. A tan to brown color also is developed in polyvinyl chloride resins when they are heated after having been compounded with a finely divided neutral or basic clay produced by adding an inorganic base to an aqueous clay slurry and then filtering and drying the treated clay.

Any substantial discoloration of the clay-filled polyvinyl chloride resin manifestly is undesirable, whether the color developed be gray or brown, since it prevents the production of white or pastel colored finished products. On the other hand, it is particularly desirable to use finely divided clays as fillers or pigments for polyvinyl chloride resins, since the clays impart improved scratch and scuff resistance to the resin compositions and improve their resistance to abrasion. They also reduce the unit cost of the finished products made from the resins.

It is an object of this invention to provide clay compositions having improved properties for use as fillers or pigments in polyvinyl chloride resin compositions.

Another object is to provide a method whereby clay fillers may be incorporated in polyvinyl chloride resins processed at the usual elevated temperatures without causing the resins to become thermally discolored.

A further object of this invention is to treat and stabilize finely divided clays so that they not only will preserve the desired color and improve other properties of polyvinyl chloride resins when used therein, but also will be compatible with the resins during mixing, compounding, calendering and molding operations at temperatures up to about 350° F.

Yet another object of this invention is to provide improved color-stable products, including shaped articles, films and sheet materials, made of polyvinyl chloride resin compositions containing clay as a filler or pigment.

It has been discovered that the objects of this invention can be accomplished by incorporating a small amount of urea in a clay to be used as a filler or reinforcing pigment in polyvinyl chloride resin compositions. When a finely divided clay containing about 0.5 to 2 parts by weight of urea per 100 parts of the clay is mixed with a polyvinyl chloride resin composition and the resulting composition is compounded and calendered or molded in the usual manner at temperatures of about 250° to 350° F., the finished products obtained show no objectionable discoloration as a result of the presence of the clay filler. Instead, they hold their desired color qualities while they are being fabricated at elevated temperatures and also under the conditions normally encountered in their use, without suffering the gray or brown discoloration that heretofore has attended the use of clay-filled polyvinyl chloride resin compositions.

Any of a wide variety of finely divided clays can be treated and used as a filler or pigment in ponlyvinyl chloride resin compositions according to the present invention. The clay use may be one of those commonly used in paper manufacture or in rubber or other plastic compositions. It may be a clay of the montmorillonite, illite or kaolin type, or of other known types. On the other hand, clays such as kaolin, which consist predominantly of kaolinite, are particularly useful for the purposes of the invention. It has been found that clay-filled ponlyvinyl chloride resin stocks and finished products having the lightest and most valuable color qualities are obtained when kaolinitic clays are treated and used in the resins according to this invention.

The final step in the processing of clays usually consists in grinding or pulverizing the clay. Urea can be conveniently incorporated with dry clay prior to the grinding, so that the ensuing grinding process in conventional equipment serves to distribute fine particles of urea in intimate contact with the particles of clay. In this way, a valuable stabilized clay composition is obtained for use in polyvinyl chloride resin compositions. If the clay has been previously ground, a similar intimate blend of fine urea particles with the clay may be produced by mixing the two substances in any suitable way, for example, by the use of apparatus conventionally employed for mixing finely divided solids. In order to obtain a thorough dispersion of the urea throughout the clay, the urea should be finely ground and the two substances should be mixed together in a dry condition.

The least amount of urea giving an appreciable degree of color stabilization is usually about 0.5 part of urea per 100 parts of clay. The most advantageous practice is to treat the clay with from 0.75 to 1.50 percent of urea, by weight. Although amounts of urea larger than 2% of the clay weight can be used to obtain polyvinyl chloride resin compositions having a stable creamy-white color, the color advantage is no greater than when amounts up to 2% are used, and the resin stocks produced with such larger amounts of urea are likely to stick to the rolls of the compounding mill at milling temperatures of 300° to 340° F. This tendency to stick to the mill rolls makes it difficult to handle the stocks, so urea additions in excess of about 2% of the clay weight generally are undesirable.

Although no precise explanation can now be given for the effects obtained according to this invention, it appears that the urea has a stabilizing action which it exerts at the surfaces of the clay particles incorporated in the polyvinyl chloride resin. The action of the urea-treated clay appears to be quite unlike the action of conventional stabilizers for vinyl chloride polymers. The effect obtained is quite surprising, since the addition of urea to vinyl chloride polymers in the absence of clay fillers and of known stabilizers causes the polymers to turn brown. Moreover, urea additions in the absence of clay will cause a brown discoloration even though certain known stabilizers are present in the polyvinyl chloride resin composition.

Preferred ways of practicing this invention and the advantages achieved by its use are further illustrated in the following examples. Proportions of various ingredients in the examples are expressed as parts or percentages by weight. The urea-treated clays employed in the examples were prepared in each instance by premixing the clay with ground crystalline urea and then passing the mixture twice through a Raymond grinding mill using a 0.01 inch slot screen.

The molded test samples referred to in the examples were produced by the use of usual commercial practices for mixing the components of the polyvinyl chloride resin compositions and for molding the compositions into test samples. A mixture of the polyvinyl chloride resin and the resin stabilizer was first prepared in a glass container. Then the liquid plasticizers were added and mixed in. About one-half of the clay was then added and mixed well before adding and mixing the remainder of the clay. The complete mixture was then added to the steel rolls of a six inch steam-heated mill while the rolls were maintained at a temperature of 300° to 310° F. The resin compositions were held and milled on the rolls for 15 or 30 minutes before sheeting off and cooling. Molded samples were obtained by pressing samples of the milled stocks in 2 x 2 x 0.1 inch electrically heated molds preheated and maintained at 340° F. The samples were heated in the molds for one minute at low pressure, then for seven minutes at high pressure, and then they were cooled to room temperature under high pressure in the following seven minutes by circulating cold water through the mold platens. The molded samples were removed from the molds, the colors were noted, and the percent reflectance of white light from the surface of each sample was measured by the use of a calibrated Densichron reflectance meter. Apart from color differences, the surface conditions of the various sets of samples were similar whether or not the samples contained urea with the clay; so only the colors of the samples affected the amounts of light reflectance. The greater percent of reflectance denotes a lighter color.

*Example 1*

A commercial grade of kaolin clay was incorporated in polyvinyl chloride resin compositions of the types used for the manufacture of floor tiles, according to the following formulations:

|  | Formula | | | |
|---|---|---|---|---|
|  | A | B | C | D |
| Polyvinyl chloride | 100 | ----- | 100 | ----- |
| Polyvinylidene chloride | ----- | 100 | ----- | 100 |
| Plasticizer (Dioctyl phthalate) | 60 | 60 | 60 | 60 |
| Stabilizer (Barium and Cadmium Laurates) | 1.2 | 1.2 | 1.2 | 1.2 |
| Untreated kaolin | 160 | 160 | ----- | ----- |
| Kaolin containing 1.25% urea | ----- | ----- | 160 | 160 |

The compositions of Formulas A and B began to turn gray upon the mill and continued to darken until slate gray products resulted after 15 minutes of milling. Samples molded as described above were also dark slate colored.

The compositions of Formulas C and D remained cream-colored on the mill even after 30 minutes of milling. Samples molded at 340° F. were also cream-colored.

*Example 2*

Various samples of clays were employed in compositions corresponding to Formula A of Example 1. These clays caused the polyvinyl chloride-clay composition to darken on the mill. The degree and shade of discoloration varied with the clay and its origin, as noted in the following table.

Samples of the same clays treated with 1.25% of urea also were employed in compositions of the same formula. As shown in the following table, the samples obtained from compositions containing the urea-treated clays in all cases were consistently lighter in color than those obtained from the corresponding untreated clays.

| Clay | Color of Molded Sample | Percent Reflectance |
|---|---|---|
| South Carolina soft kaolin untreated | Slate | 9 |
| South Carolina soft kaolin urea-treated | Cream | 23 |
| South Carolina hard kaolin untreated | Dark slate | 4 |
| South Carolina hard kaolin urea-treated | Cream | 22 |
| English kaolin untreated | Greenish-brown | 6 |
| English kaolin urea-treated | Light greenish-brown | 10 |
| German kaolin untreated | Tan | 13 |
| German kaolin urea-treated | Light tan | 17 |

*Example 3*

As shown in Examples 1 and 2, the stabilizer composed of barium and cadmium laurates did not prevent the gray color from developing in polyvinyl chloride resins containing clay. Other stabilizers were equally ineffective, as shown by tests summarized in the following table:

|  | Formula | | | | | |
|---|---|---|---|---|---|---|
|  | A | B | C | D | E | F |
| Polyvinyl chloride | 100 | 100 | 100 | 100 | 100 | 100 |
| Plasticizer (Dioctyl phthalate) | 60 | 55 | 60 | 60 | 60 | 60 |
| Untreated kaolin | 160 | 160 | 160 | ----- | ----- | ----- |
| Kaolin containing 1.25% urea | ----- | ----- | ----- | 160 | 160 | 160 |
| Stabilizer (Barium and Cadmium Laurates) | 1.2 | ----- | ----- | 1.2 | ----- | ----- |
| Stabilizer ("Paraplex G-62" [1] Polyester) | ----- | 5.0 | ----- | ----- | 5.0 | ----- |
| Stabilizer (Basic lead carbonate) | ----- | ----- | 5.0 | ----- | ----- | 5.0 |
| Color of molded sample | Dark slate | Slate | Dark slate | Cream | Cream | Cream |

[1] Rohm and Haas Co. (polyester resins based on long chain polybasic acids esterified with polyhydric alcohols such as glycol or ethylene glycol).

*Example 4*

The effects of varying the amount of urea used to treat a given amount of clay are demonstrated by the following data. Stocks were prepared by the usual procedure from 100 parts of polyvinyl chloride, 60 parts of plasticizer (dioctyl phthalate), 1.2 parts of stabilizer (barium and cadmium laurates) and the following urea-treated clays.

| Treated Clay | Parts/100 PVC | Behavior on Milling | Color of Molded Sample |
|---|---|---|---|
| Kaolin+0.375% urea | 160 | Normal | Gray-tan. |
| Kaolin+0.625% urea | 161 | ----do---- | Do. |
| Kaolin+1.25% urea | 162 | ----do---- | Cream. |
| Kaolin+1.5% urea | 162.5 | ----do---- | Do. |
| Kaolin+3.0% urea | 165 | Sticks to rolls | Do. |
| Kaolin+6.0% urea | 170 | ----do---- | Do. |

Example 5

The unique ability of urea-treated clay to overcome the discoloration of clay-filled polyvinyl chloride resin compositions is shown by the following comparisons of the result obtained from urea-treated clay with the results obtained from the use of a similar clay treated with various other substances known to be stabilizers for polyvinyl chloride resins. The treated clays were compared in stocks corresponding to Formula A, Example 1, and were mixed and molded in the usual procedure.

| Chemical Used in Treating Clay | Percent of the Clay | Color of Milled and Molded Stock |
|---|---|---|
| Thiourea | 1.25 | Gray. |
| Guanidine sulfate | 1.25 | Dark gray. |
| Asymmetrical-dibutylurea | 1.25 | Light brown. |
| Symmetrical-dibutylurea | 1.25 | Tan to brown. |
| Di-ortho-tolyl guanidine | 1.25 | Do. |
| Phenylurea | 1.25 | Gray-brown. |
| Asymmetrical-diphenylurea | 1.25 | Gray. |
| Symmetrical-diphenylurea | 1.25 | Red-brown. |
| Butylamine | 1.25 | Deep tan. |
| Dibutylamine | 1.25 | Light brown. |
| Diphenylamine | 1.25 | Dark gray. |
| Aniline | 1.25 | Red-brown. |
| Ammonia gas [1] | | Gray. |
| Aqueous sodium hydroxide | | Gray to light brown. |
| Aqueous barium hydroxide | | Light brown. |
| Aqueous calcium hydroxide | | Do. |
| Urea | 1.25 | Pale cream. |

[1] Sufficient ammonia was added to produce a clay of pH 7.2. The amounts of sodium, barium and calcium hydroxide used were sufficient to produce basic slurries.

Example 6

The effects of urea on polyvinyl chloride polymers and polyvinylidene chloride polymers in the absence of clay filler are shown in the following table. Samples were prepared in the usual procedure except that the clay was omitted. The percent reflectance was obtained from the molded samples.

| | A | B | C | D | E | F | G |
|---|---|---|---|---|---|---|---|
| Polyvinyl chloride | 100 | 100 | 100 | 100 | | | |
| Polyvinylidene chloride | | | | | 100 | 100 | 100 |
| Plasticizer (Dioctyl phthalate) | 50 | 50 | 50 | 50 | 50 | 50 | 50 |
| Stabilizer (Ba and Cd laurates) | | | 2.0 | 2.0 | | | 2.0 |
| Urea | | 2.0 | | 2.0 | | 2.0 | |
| Milling time at 300–310° F./Min | 30 | 30 | 30 | 30 | 15 | 15 | 15 |
| Color of molded samples | Brown | Brown | Clear | Clear | Brown | Brown | Clear |
| Percent reflectance | 3 | 2 | 22 | 17 | 6 | 4 | 32 |

The above data demonstrate that urea is not a heat stabilizer for polyvinyl chloride resins. Instead, urea caused the resins to become darker than when no urea was present. The barium and cadmium laurates did stabilize the resin and even reduced the amount of discoloration caused by the urea itself, but stock D containing both the stabilizer and urea was darker than stock C which contained the stabilizer alone.

The urea-treated clays disclosed herein are valuable as fillers for vinyl chloride polymers and vinylidene chloride polymers, and for copolymers of these two monomers with each other. The treated clays may also be used to advantage with other copolymers in which the total content of polyvinyl chloride or polyvinylidene chloride, or of both, exceeds about 50 percent by weight.

It will be understood that the manner of use of this invention is not limited to the particular formulations shown in the examples. For example, the amount of treated clay to be used in the resin compositions may be varied from as little as a trace up to as much as 250 parts or more per hundred parts of the resin, depending upon the other materials used and the properties desired in the finished product. Moreover, as is well known in the art, various plasticizers, stabilizers, coloring materials, fillers, lubricating aids and other chemicals may be used, and the proportions in which they may be used are subject to wide variations.

What is claimed is:

1. The method of producing a color-stable clay-filled polyvinyl chloride resin composition, which comprises incorporating in a polyvinyl chloride resin composition a finely divided clay and urea in a small amount sufficient to inhibit thermal discoloration of said composition in the presence of the clay.

2. The method of producing a color-stable clay-filled polyvinyl chloride resin composition, which comprises incorporating in a polyvinyl chloride resin composition a finely divided clay and about 0.5 to 2 parts by weight of urea per 100 parts of the clay.

3. The method of producing light-colored abrasion-resistant products from polyvinyl chloride resin compositions, which comprises incorporating with a polyvinyl chloride resin composition a finely divided mixture of a clay and about 0.5 to 2 parts by weight of urea per 100 parts of the clay, and milling the resulting composition at a temperature between 250° and 350° F.

4. A polyvinyl chloride resin composition containing a finely divided clay and urea in a small amount sufficient to inhibit thermal discoloration of said composition in the presence of the clay.

5. A polyvinyl chloride resin composition having intimately dispersed therein a finely divided clay and about 0.5 to 2 parts by weight of urea per 100 parts of the clay.

6. A polyvinyl chloride resin composition comprising a resin from the group consisting of polymers and copolymers of vinyl chloride and vinylidene chloride and a finely divided mixture of a clay and about 0.5 to 2 parts by weight of urea per 100 parts of the clay.

7. The method of producing a color-stable clay-filled polyvinyl chloride resin composition, which comprises incorporating in a polyvinyl chloride resin composition finely divided kaolin and urea in a small amount sufficient to inhibit thermal discoloration of said composition in the presence of the kaolin.

8. A polyvinyl chloride resin composition containing finely divided kaolin and urea in a small amount sufficient to inhibit thermal discoloration of said composition in the presence of the kaolin.

References Cited in the file of this patent

UNITED STATES PATENTS

| | | |
|---|---|---|
| 2,022,676 | Kniskern et al. | Dec. 3, 1935 |
| 2,103,581 | Gray | Dec. 28, 1937 |
| 2,311,233 | Jaenicke et al. | Feb. 16, 1943 |